Nov. 30, 1926.

H. J. ENGBRECHT 1,609,015

GREASE CHARGING APPARATUS

Filed April 27, 1925    4 Sheets-Sheet 2

Inventor:
Herman J. Engbrecht,
By Dyrenforth, Lee, Chritton and Wiles,
Attys.

Nov. 30, 1926. 1,609,015
H. J. ENGBRECHT
GREASE CHARGING APPARATUS
Filed April 27, 1925   4 Sheets-Sheet 3
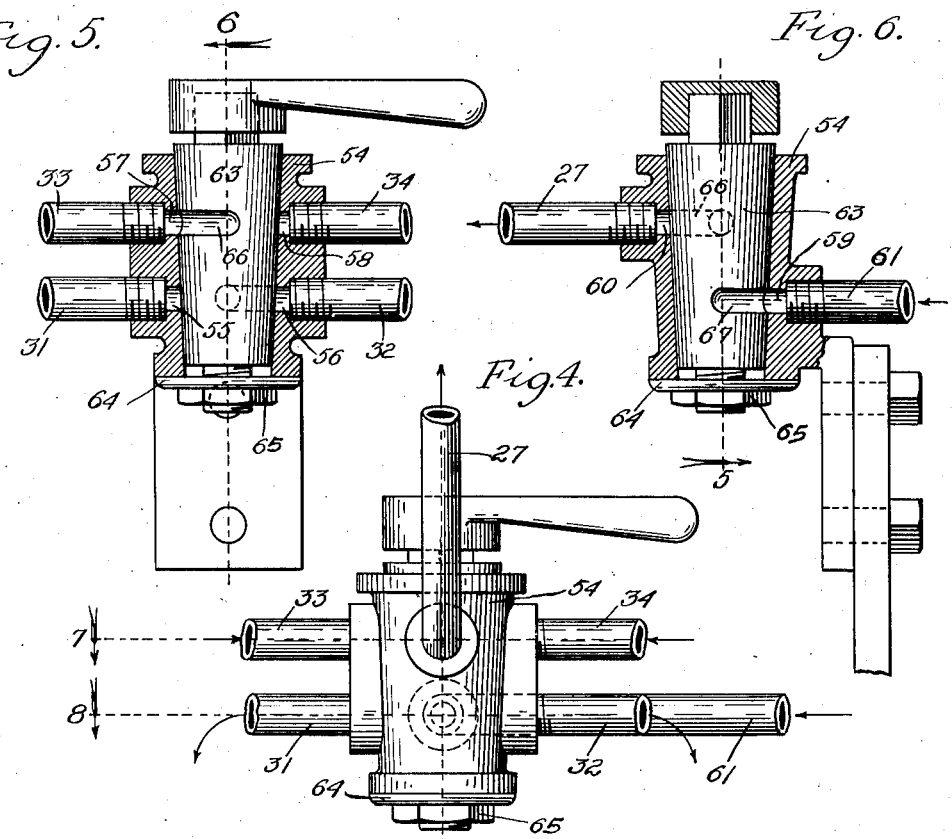
Inventor:
Herman J. Engbrecht,
By Dyrenforth, Lee, Chritton, and Wiles,
Attys.

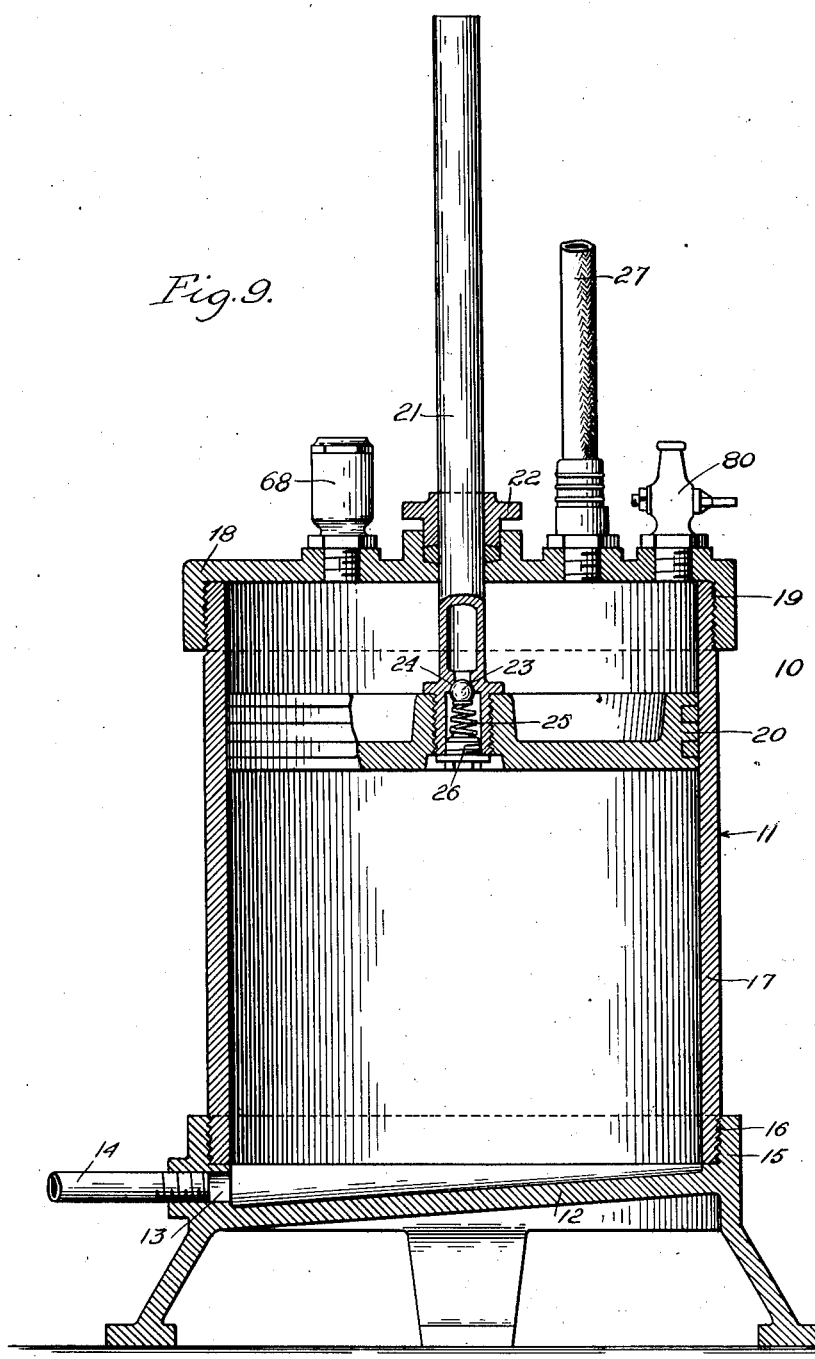

Patented Nov. 30, 1926.

1,609,015

UNITED STATES PATENT OFFICE.

HERMAN J. ENGBRECHT, OF CHICAGO, ILLINOIS, ASSIGNOR TO STANDARD OIL COMPANY, OF WHITING, INDIANA, AND CHICAGO, ILLINOIS, A CORPORATION OF INDIANA.

GREASE-CHARGING APPARATUS.

Application filed April 27, 1925. Serial No. 26,204.

My invention relates to apparatus for introducing grease under relatively great pressure, into bearings, particularly of automobiles.

Certain of my objects are to provide a novel apparatus for this purpose and by which the grease may be forced to the bearings to be supplied therewith, under sufficient pressure to force out of the bearings hard accumulations existing therein and supply the bearings with fresh grease; to provide an apparatus for this purpose by the use of which the greasing operation may be quickly effected; to provide a fluid pressure-operated apparatus of the character stated; to provide for the automatic charging of the grease-forcing element of the apparatus, with grease; to provide for accurate control, by the operator, of the pressure at which the grease is supplied to the bearings to be lubricated; and other objects as will be manifest from the following description.

Referring to the accompanying drawings:—

Figure 1:
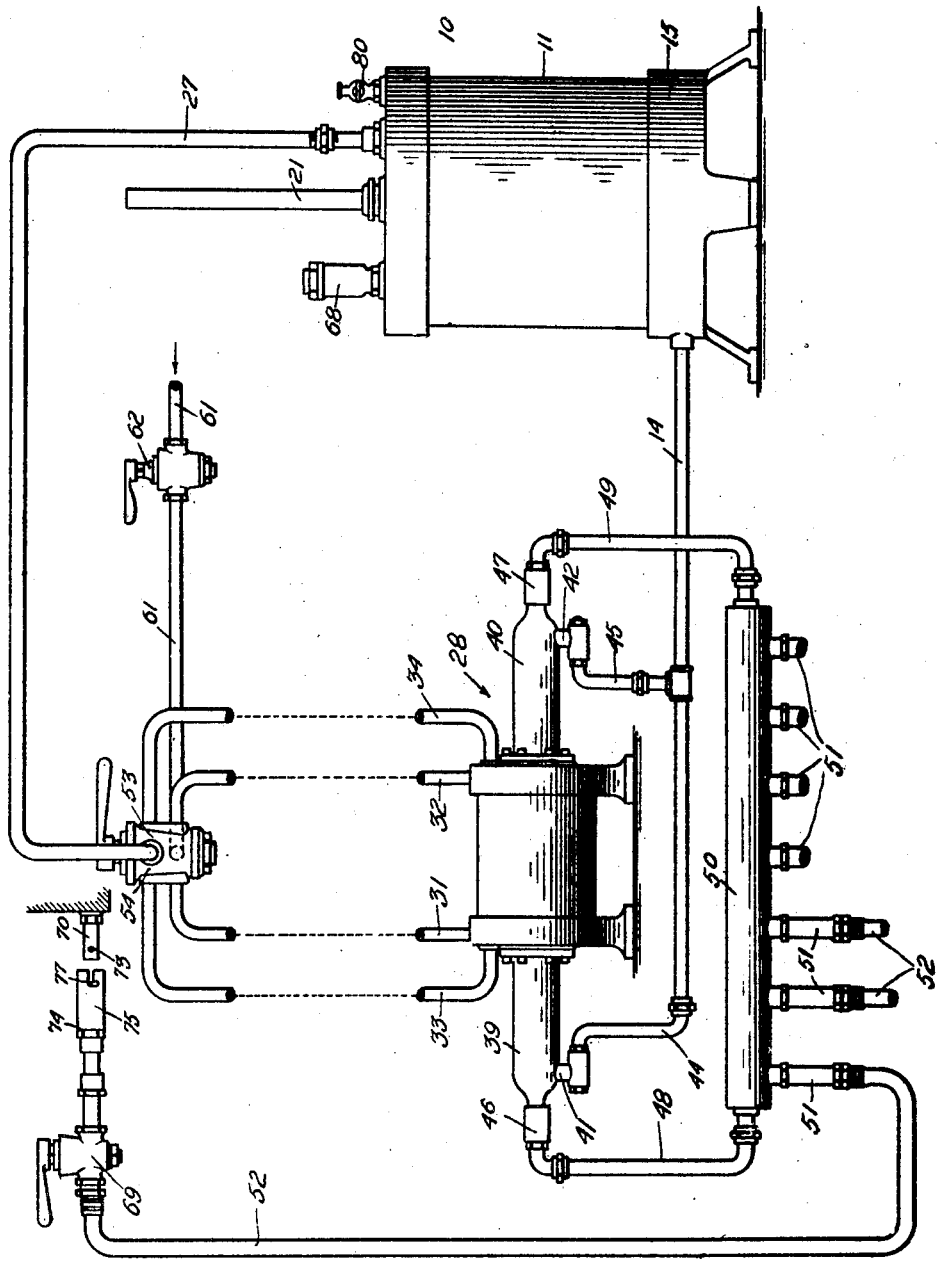
Figure 2:
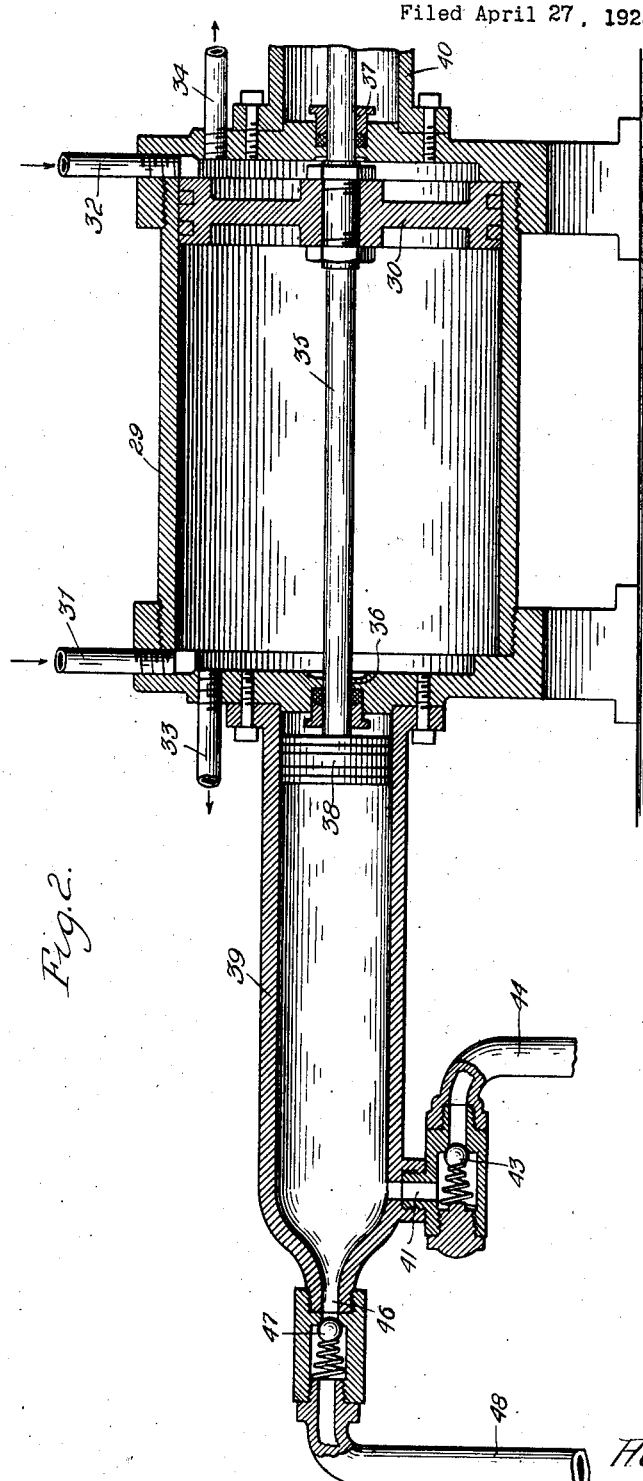
Figure 3:
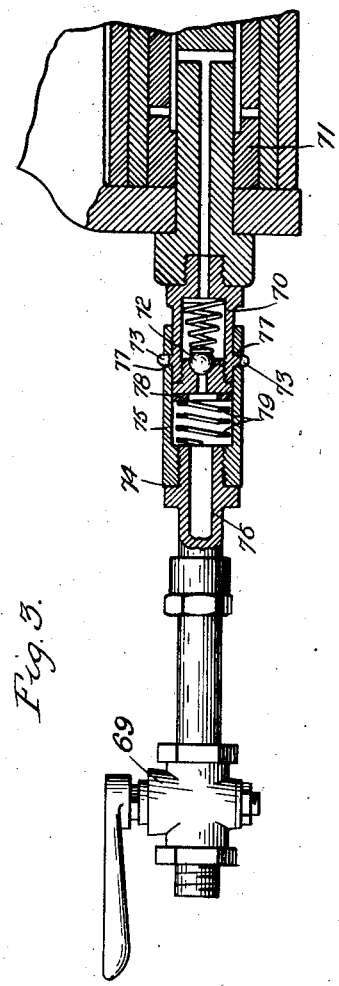

Figure 1 is a view, in the nature of a diagram, of apparatus embodying my invention, certain parts thereof being broken away. Figure 2 is a broken view, in sectional elevation, of the grease-forcing piston and cylinder mechanism forming a part of the apparatus. Figure 3 is a side view of one of the similar couplings provided on the ends of the flexible hose-lines through which the grease is forced to the nipples of the bearings, this view showing, in section, a nipple-equipped bearing to be lubricated, with the coupling applied thereto in operative position. Figure 4 is a view in elevation of the valve device for controlling the supplying of fluid-pressure to the piston and cylinder mechanism of Fig. 2. Fig. 5 is a view in sectional elevation of the valve device of Fig. 4, the section being taken at the line 5 on Fig. 6, and viewed in the direction of the arrow. Figure 6 is a section taken at the line 6 on Fig. 5, and viewed in the direction of the arrow. Figure 7 is a section taken at the line 7 on Fig. 4 and viewed in the direction of the arrow. Figure 8 is a section taken at the line 8 on Fig. 4 and viewed in the direction of the arrow; and Figure 9, a view in sectional elevation of a grease-container forming a part of the apparatus.

The illustrated, preferred, embodiment of my invention comprises a container-unit for the grease, represented at 10 and comprising a receptacle 11 the upper surface of the bottom plate of which, and represented at 12, is shaped, as shown, to slope downwardly in all directions to an outlet 13 communicating with a pipe 14. The plate portion 12 is provided with an upwardly extending annular flange 15 threaded at its inner surface, as represented at 16. The cylindrical side-wall of the receptacle 11, and represented at 17, screws at its lower end into the flanged portion of the plate member 12 and is equipped at its upper end with a cap-plate 18 screwed upon the upper threaded end of the wall portion 17, as indicated at 19. The receptacle 11 contains a piston 20 provided with an upwardly extending hollow stem 21 which extends through a stuffing-box-equipped opening 22 in the cover 18. The stem 21 which is open at its upper end, opens at its lower end into the receptacle 11 below the piston 20, the stem being provided with a downwardly opening check-valve formed of a ball 23 which is yieldingly forced upwardly against a seat 24 on the stem, by a coil spring 25 confined between the ball and a tubular plug 26 screwed into the lower open end of the stem 21.

The container unit 10 is provided for the purpose of receiving a relatively large quantity of grease, as for example, 25 or 50 pounds thereof which is introduced into the receptacle 11, the piston 20 having been preliminarily removed, and the piston thereafter introduced into the upper end of the receptacle and the cap 18 secured in place on the latter.

The piston 20 which serves to force the grease from the receptacle 11 through the pipe 14 to the portion of the apparatus, and hereinafter described, which places the grease under the desired pressure, may be operated in any suitable way. In the arrangement shown the piston is operated by air pressure supplied to the receptacle 11 above the piston 20 through a pipe 27 opening through the cover 18 and leading from a source of fluid pressure as hereinafter described.

The grease-forcing unit of the apparatus, is represented generally at 28, and in the particular illustrated embodiment of my invention comprises a cylinder 29 containing a power piston 30 adapted to be reciprocated therein by the introduction of fluid pressure into the ends of the cylinder, alternately, through pipes 31 and 32, respectively, these respective ends of the cylinders being equipped with exhaust pipes 33 and 34. The piston 30 is connected with a stem 35, midway between the ends of the latter, this stem being reciprocable in packing-gland-equipped openings 36 and 37 in the ends of the cylinder 29, the ends of the stem 35 being connected with grease-displacement pistons, the piston at one end thereof being represented at 38. The pistons just referred to and carried on the ends of the stem 35 and which, as noted, are of considerably smaller diameter than the power piston 30, are reciprocable in similar grease-displacement cylinders 39 and 40, respectively, shown as connected with the end walls of the cylinder 29 and extending in alignment with each other and with the cylinder 29.

In the apparatus shown the grease to be supplied to the bearings is caused to enter the cylinders 39 and 40 alternately, upon the suction strokes of the pistons therein, and be forced from these cylinders alternately, under the desired pressure, upon the movement of these pistons in the opposite direction. The inlets through which the grease enters the cylinders 39 and 40, and which are located adjacent the outer ends of the cylinders, are represented at 41 and 42, these inlets, which are controlled by inwardly-opening ball check-valves as shown of the valve 43 for the inlet 41, communicating, respectively, with the branch pipes 44 and 45 of the pipe 14. The outlets of the cylinders 39 and 40 and through which the grease is forced by the action of the pistons therein, are represented at 46 and 47, respectively, these outlets being equipped with outwardly-opening ball check-valves, as shown of the valve for the cylinder 39, at 47, these outlets communicating, respectively, with pipes 48 and 49, connected with the opposite ends of a header 50 having branch outlet pipes 51 for connection therewith of the flexible hose-lines, certain of which are represented at 52, for application to the bearings to be greased.

It will be understood from the foregoing that upon introducing fluid pressure into the ends of the cylinder 29 alternately, and alternately venting this cylinder ahead of the piston 30 therein, the piston 30 will be reciprocated in the cylinder 29, with the result of reciprocating the grease-displacing pistons provided on the ends of the stem 35 and which operate alternately to force grease to the header 50.

Assuming that the parts of the piston and cylinder mechanisms illustrated in Fig. 2 are in the positions therein shown and that the cylinder 39 contains a charge of grease supplied to it through the pipe 14 by the action hereinafter referred to, fluid pressure introduced into the cylinder 29 through the pipe 32, the inlet pipe 31 and the exhaust pipe 34 being closed and the exhaust pipe 33 open, will force the piston 30 to the left in this figure with the result of moving the piston 38 in the same direction and thereby subjecting the grease in the cylinder 39 to relatively great pressure which forces it to the header 50 and into the hose lines 52, the check valve 43 in the movement of this piston 38 closing as soon as the pressure in this cylinder exceeds the pressure of the grease in the pipe 14. In this movement of the piston 30 the piston in cylinder 40 also moves to the left in Fig. 2, the check valve at the outlet of this cylinder automatically closing and the check valve at the branch pipe 45 automatically opening, the latter as soon as the pressure in the branch pipe 45 exceeds the pressure in the cylinder 40, whereupon the cylinder 40 becomes charged with grease.

Upon reversing the direction of movement of the piston 30 and the pistons in the cylinders 39 and 40, by introducing fluid pressure into the cylinder 29 through the pipe 31, the inlet 32 and the exhaust pipe 33 being closed and the exhaust pipe 34 open, the piston in the cylinder 40 operates to force the grease charged therein as stated, to the header 50 and the hose lines 52, and the cylinder 39 becomes charged with grease from the pipe 14 as explained of the charging of the cylinder 40 by the movement of these pistons to the left in Fig. 2. The pistons in cylinders 39 and 40 thus operate alternately to force the grease to the header 50 and the hose lines 52. The means shown for controlling the supplying of fluid pressure to the cylinder 29 and the exhausting of the same as hereinbefore described, comprise a valve-device 53 formed of a casing 54 containing ports 55 to 60, inclusive, the ports 55, 56, 57 and 58 communicating, respectively, with the pipes 31, 32, 33, 34, the port 59 communicating with a pipe 61, valved at 62, and leading from any suitable source of fluid pressure, as for example a compressed air tank (not shown), and the port 60 communicating with the pipe 27. The valve device 53 also comprises a plug-valve 63, preferably of tapered form, rotatably confined in the casing 54 by a washer 64 held on the smaller end of the valve 63 by a nut 65 and flatwise engaging the adjacent end surface of the casing 54. The valve 63 contains two ports 66 and 67 in its side, the port 66 being disposed in the plane of the ports 57, 58 and 60, and the port 67 in the plane of the ports 55, 56 and 59. The various ports referred to are so arranged and proportioned, as shown, that when the valve 63 is in the position shown in the drawings, the port 67 will communicate with the ports 56 and 59 and the port 66 will communicate with the ports 57 and 60 and thus permit fluid pressure supplied through the pipe 61 to enter the right-hand end of the cylinder 29 and permit the fluid pressure at the opposite side of the piston 30 to exhaust, this exhaust pressure discharging through the pipe 27 to the receptacle 11 for forcing the piston 20 therein downwardly, for the purpose hereinbefore explained; and when the valve 63 is rotated 90° in counterclockwise direction in Figs. 7 and 8, the port 67 will communicate with the ports 55 and 59 and the port 66 will communicate with the ports 58 and 60, and thus reverse the flow of fluid pressure to the cylinder 29 and the exhaust therefrom, the exhausting fluid pressure flowing to the receptacle 11 through the pipe 27.

It may be here stated that in practice the receptacle 11 would be provided with a relief valve 68 for relieving the pressure therein above the piston 20 when it exceeds the predetermined amount desired to be applied against the top of this piston.

Each hose line 52 provided for connection with nipples on bearings to be charged with grease, is equipped with a fitting at which it is adapted to connect with the nipple on the bearing, and in advance of this fitting is provided with a shut-off valve 69. Any desirable form, or forms, of fittings may be used. Where the nipples of the bearings to be supplied with grease vary as to form or size, as they often do in practice, the fittings of the various hose lines 52 may be constructed of different forms or sizes to adapt the apparatus to be used in connection with such nipples. In the apparatus shown only one form of fitting is illustrated for co-operation with a particular form of bearing-nipple represented at 70 as operatively assembled with a spring-shackle represented at 71, this nipple being of the type comprising an inwardly opening check valve 72 and provided with diametrically opposed radially-extending studs 73. The fitting of the hose-line 52 for co-operation with such a nipple is represented at 74 and comprises a sleeve-like member 75 screwed upon a tubular member 76 secured to the hose-line, with its outer, open, end portion containing bayonet slots 77 to receive, and interlock with, the studs 73 upon telescoping the member 75 with the nipple 70 and partially rotating it thereon; a washer 78, as for example of fiber, slidable in the sleeve 75, and a coil spring 79 backing said washer, the washer 78, in connecting the fitting with the nipple, pressing flatwise against the outer face of the nipple under the action of the spring 79 and forming a tight joint between the nipple and sleeve ensuring against egress of the grease through the joint under relatively great pressure.

The receptacle 11 is shown as provided in its top with a vent terminating in a stopcock 80 provided for the purpose of venting, under the control of the operator, the portion of the receptacle 11 above the piston 20, of the air therein, in the raising of the piston 20 preliminary to the grease recharging operation, the check-valve-equipped stem 21 operating automatically, in the upward movement of the piston 20, to permit air to be drawn into the receptacle below the piston and thus relieve the receptacle of the suction produced by such movement of the piston.

The stem 21 of the piston 20 may, if desired, be provided with any suitable markings (not shown) for co-operation with a marking on a stationary part of the unit 10, to indicate the amount of grease in the receptacle 11.

It will be understood from the foregoing that by constructing the grease dispersing unit with differential pistons, the smaller one of which is a grease-displacing piston, the pressure applied to the grease may be caused to greatly exceed the fluid pressure available for driving the power piston 30 and the desired grease-displacing pressure exerted even when the pressure of the operating fluid is relatively low. This feature of the apparatus is of special importance when the apparatus is to be used in the ordinary service station equipped with apparatus for supplying compressed air at relatively low pressure, as for example for tire inflation, inasmuch as such low pressure air may be employed in the operation of my apparatus to produce the desired relatively high grease-displacing pressure.

While I have illustrated and described a particular construction embodying my invention, I do not wish to be understood as intending to limit it thereto, as the same may be variously modified and altered without departing from the spirit of my invention.

What I claim as new, and desire to secure by Letters Patent, is:

1. Lubricant-forcing mechanism comprising a cylinder for the lubricant containing an inlet for fluid pressure and an outlet for the material adjacent its opposite ends, a piston in said cylinder for exerting pressure on the lubricant, means for supplying fluid pressure to said cylinder through said inlet, and a valve-controlled conduit opening through that face of said piston which is at the outlet end of said cylinder and opening exteriorly of said cylinder.

2. Lubricant-forcing mechanism comprising a cylinder for the lubricant and containing an inlet for fluid pressure and an outlet for the material adjacent its opposite ends, a piston in said cylinder for exerting pressure on the lubricant, means for supplying fluid pressure to said cylinder through said inlet, a conduit opening through that face of said piston which is at the outlet end of said cylinder and opening exteriorly of said cylinder, and an inwardly-opening check-valve in said conduit.

3. Lubricant-forcing mechanism comprising a cylinder for the lubricant and containing an inlet for fluid pressure and an outlet for the material adjacent its opposite ends, a piston in said cylinder for exerting pressure on the lubricant, means for supplying fluid pressure to said cylinder through said inlet, a hollow stem connected with said piston and opening at one end through that face of said piston which is at the outlet end of said cylinder and at its other end to the atmosphere, and a valve controlling the opening in said stem.

HERMAN J. ENGBRECHT.